(12) United States Patent
Watkins et al.

(10) Patent No.: US 8,522,002 B2
(45) Date of Patent: Aug. 27, 2013

(54) SYSTEMS AND METHODS FOR DEPLOYMENT OF BOOT IMAGES IN DISKLESS SERVERS

(75) Inventors: Mark R. Watkins, Bristol (GB); Bradley G. Culter, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 12/811,198

(22) PCT Filed: Jan. 28, 2008

(86) PCT No.: PCT/US2008/052235
§ 371 (c)(1),
(2), (4) Date: Jun. 29, 2010

(87) PCT Pub. No.: WO2009/096944
PCT Pub. Date: Aug. 6, 2009

(65) Prior Publication Data
US 2010/0287365 A1    Nov. 11, 2010

(51) Int. Cl.
*G06F 9/00*    (2006.01)
*G06F 15/177*    (2006.01)

(52) U.S. Cl.
USPC .............................................................. 713/2

(58) Field of Classification Search
USPC .............................................................. 713/2
See application file for complete search history.

(56) References Cited

U.S. PATENT DOCUMENTS

| | | | |
|---|---|---|---|
| 5,872,968 A * | 2/1999 | Knox et al. ...................... | 713/2 |
| 6,810,478 B1 | 10/2004 | Anand et al. | |
| 6,954,852 B2 | 10/2005 | Burokas et al. | |
| 7,246,221 B1 * | 7/2007 | Soltis et al. ....................... | 713/1 |
| 7,310,744 B2 | 12/2007 | Maity et al. | |
| 2003/0088650 A1 * | 5/2003 | Fassold et al. ................ | 709/220 |
| 2003/0208675 A1 | 11/2003 | Burokas et al. | |
| 2004/0111559 A1 | 6/2004 | Heil | |
| 2005/0138346 A1 | 6/2005 | Cauthron | |
| 2006/0020848 A1 | 1/2006 | Maity et al. | |

(Continued)

FOREIGN PATENT DOCUMENTS

| | | |
|---|---|---|
| CN | 1592889 | 3/2005 |
| GB | 2397924 | 5/2003 |
| WO | WO2006013559 | 2/2006 |

OTHER PUBLICATIONS

GB Examination Report dated Mar. 8, 2012, 4 pages.

(Continued)

*Primary Examiner* — Mohammed Rehman

(57) ABSTRACT

In one embodiment, a system, comprises a first computer system comprising at least a first diskless server, at least a first RAID controller coupled to the first diskless server, at least a first storage pool coupled to the RAID controller, and a remote management server coupled to the RAID controller via a an out-of-band communication link. The remote management server comprises a boot management module which, when executed, initiates a command to instruct the RAID controller to create at least a first logical volume in a memory module coupled to the RAID controller, transmits the command to the RAID controller via the out-of-band communication link, and transmits a boot image from the remote management server to the RAID controller via the out-of-band communication link. The RAID controller creates the first logical volume for the boot image in response to the command, and stores the boot image in the first logical volume.

17 Claims, 3 Drawing Sheets

(56) References Cited

U.S. PATENT DOCUMENTS

| | | |
|---|---|---|
| 2006/0117172 A1 | 6/2006 | Zhang et al. |
| 2006/0129788 A1* | 6/2006 | Maeda et al. ............... 713/1 |
| 2007/0192466 A1 | 8/2007 | Nahum |
| 2007/0268917 A1* | 11/2007 | Wong et al. ............... 370/401 |
| 2009/0164769 A1* | 6/2009 | Cherian et al. ............... 713/2 |

OTHER PUBLICATIONS

International Seach Report, PCT/US2008/052235, Oct. 8, 2008, 9 Pages.

HPDC, PCT Notification of Transmittal of the International Search Report and the Written Opinion of the International Searching Authority, or the Declaration mailed Oct. 8, 2008, PCT/US2008/052235, filed Jan. 28, 2008.

Brisse, M.; Tawil, A.; Reeves, D:. In.: Dell. USA: Understanding Boot-From-San Technology. 2005. S. 1-8.

Enterprise Platforms and Services Division: Intel Modular Server System MFSYS25. In: Intel USA: Technical Product Specification: 2007 (E15155-003), S. 1-46.

Intel: Intel Modular Server built on Intel Multi-Flex Technology. USA, 2007. S. 1-6.

Pruette, G.: BladeCenter systems management software. In IBM Journal of Research and Development, 49, 2005, 6, S. 963-975. ISSN 18-8646.

Storage area network, In: Wikipedia, the free encyclopedia.

Tate, J; Lucchese, F.; Moore, R.: Introduction to Storage Area Networks. Redbooks. 4. Auflage. USA: International Technical Support organization, 2006, s. 1-352.

Yung-Chin Fang: Dell OpenManage Tools for High-Performance Computing Cluster Management. In: Dell USA: Dell Power Solutions. 2005. S. 40-45.

* cited by examiner

SYSTEMS AND METHODS FOR DEPLOYMENT OF BOOT IMAGES IN DISKLESS SERVERS

CROSS-REFERENCE TO RELATED APPLICATION

The present application is the U.S. National Stage under 35 U.S.C. §371 of PCT/US2008/052235, filed 28 Jan. 2008, the disclosure of which is hereby incorporated herein by reference.

BACKGROUND

This application relates to electronic computing and more particularly to deployment of boot images in diskless servers.

Computing networks may be populated with servers and client computers. Servers are generally more powerful computers that provide common functions such as record sharing and Internet access to the client computers. Client computers may be fully functional computers, each having a processor, hard drive, CD ROM drive, floppy drive and system memory.

A central server may contain one or more blade computers, which are ultra-dense, low power blade computers designed to provide a high level of computing power in a relatively small space. In some applications hundreds of blade computers may be mounted in a single rack. Because blade computers consume less space, power, and produce less heat than conventional rack-mounted computers, they may result in significant cost savings. Additionally, blade computers may be connected in parallel to form computing engines of immense power.

Some blade computers utilize servers referred to as "diskless servers" which do not include a hard drive or other magnetic storage media. The absence of a hard drive or other magnetic storage media prevents a typical disk-based boot operation from being implemented. Thus, additional techniques to implement boot operations in the blade computer systems would find utility.

DETAILED DESCRIPTION

Described herein are exemplary systems and methods for deploying boot images in a diskless server. The methods described herein may be embodied as logic instructions on a computer-readable medium. When executed on one or more processor(s), the logic instructions cause the processor(s) to be programmed as a special-purpose machine that implements the described methods. The processor(s), when configured by the logic instructions to execute the methods recited herein, constitutes structure for performing the described methods.

Figure 1:
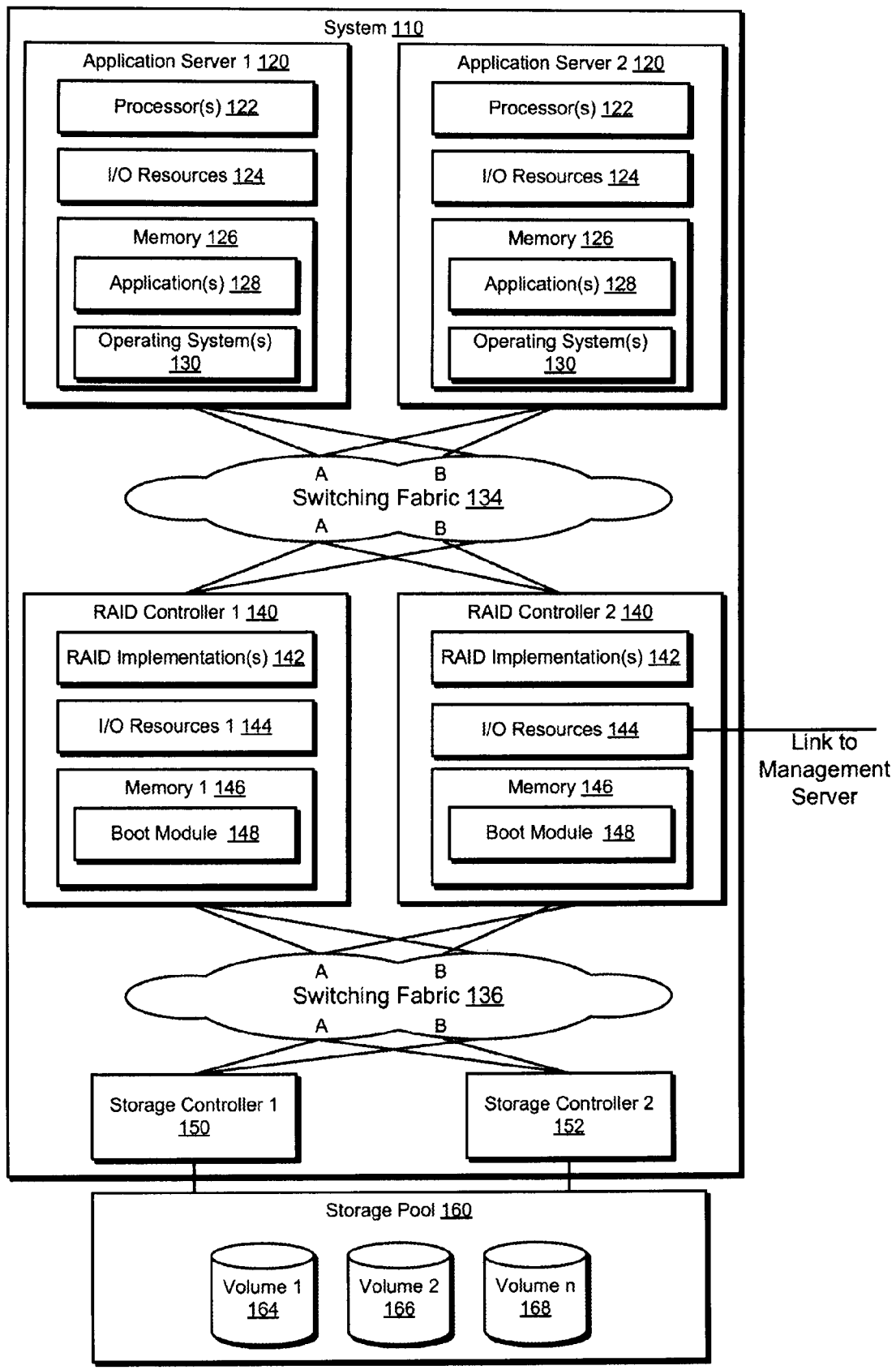
FIG. 1 is a schematic illustration of a blade computer system, according to embodiments.

FIG. 1 is a schematic illustration of a blade computer system 110, according to embodiments. Referring to FIG. 1, blade computer system 110 comprises at least one application server 120 coupled by a switching fabric 134 to at least one RAID controller 140, which is in turn coupled by a switching fabric 136 to at least one disk controller 150. The disk controller(s) 150 provide access to storage media in a storage pool 160 blade computer system 110.

In the embodiment depicted in FIG. 1, the blade computer system 110 comprises two application servers 120. In practice a blade computer system may comprise as few as a single application server 120. There is no theoretical upper limit to the number of application servers 120 which may be incorporated into a blade computer system. In practice, existing blade computer systems can support as many as sixty-four application servers 120 in an enclosure.

Each application server 120 comprises one or more processors 122, input output resources 124, and a certain amount of memory 126, typically implemented as random access memory (RAM), on which one or more applications 128 and one or more operating systems 130 reside. In an embodiment in which the application server 120 is a diskless server, the application server 120 does not include magnetic media such as a hard drive. Instead, large scale storage needs are provided by the storage pool 160.

Each RAID controller 140 comprises logic to implement at least one RAID implementation 142. The specific RAID implementation is not critical to the subject matter described herein. RAID controller 140 further comprises input/output resources 144 and a memory module 146, typically implemented as random access memory (RAM), on which a boot module application 148 executes. In one embodiment, input/output resources 144 comprise at least one an out of band management port which provides an out-of-band link to a management server. The particular implementation of the out-of-band link is not critical. For example, an Ethernet link or an RS232 link may be used to implement the out-of-band link.

Storage controllers 150, 152 may be implemented as conventional disk controllers, network attached storage (NAS) controllers, or storage area network (SAN) controllers, depending upon the complexity and configuration of the system 110. Similarly, the storage pool 160 may be implemented as a JBOD (just a bunch of disks) storage configuration or in a more complex configuration depending upon the complexity and configuration of the system 110.

Switching fabrics 134, 136 may be implemented in accordance with one or more of several protocols. For example, switching fabrics 134, 136 may operate according to Ethernet protocols, Fibre Channel protocols, InfiniBand Protocols, SAS (Serial-Attached-SCSI (small computer serial interface)) protocols, or the like.

In operation, applications 128 executing on an application server 120 generate input/output requests to storage provided by storage for 160. The input/output requests are transmitted by switching fabric 134 to a RAID controller 140, which a level of RAID processing to the input/output requests. RAID controller 140 transmits the requests via the switching fabric 136 to at least one of the storage controllers 150, 152, which in turn accesses data in the storage pool 160.

As described above, when application server 120 is implemented as a diskless server issues are created with respect to booting the first server in the system 110. In conventional operation, the first server is booted manually by a system administrator or other network technician, typically by coupling a boot media to the application server 120. This manual process, while effective, is slow and expensive to implement.

In one embodiment, the system 110 depicted in FIG. 1 resolves this problem by enabling the boot module 148 in the RAID controller 142 to obtain a boot image for at least one application server 120 from a remote management server via the out-of-band communication link between the I/O resources 144 of raid controller 140, and to store the boot image in a logical volume in the storage pool 160. Once the boot image is stored in a logical volume, a server 120 can boot from the boot image.

Figure 2:
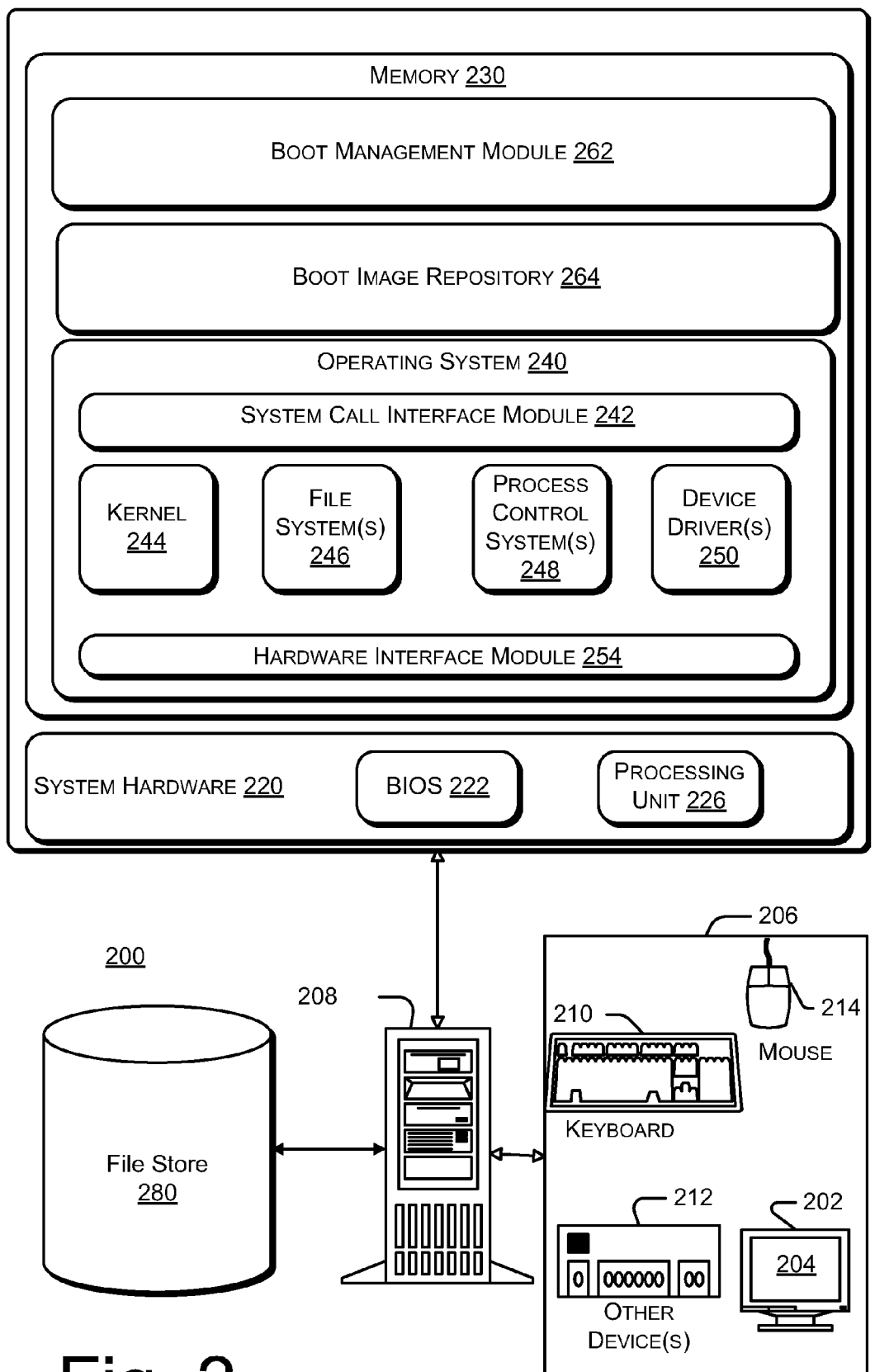
FIG. 2 is a schematic illustration of a remote boot management server system, according to embodiments.

FIG. 2 is a schematic illustration of a computing system 200 in which the remote management system may be implemented, according to some embodiments. In the illustrated embodiment, system 200 may be embodied as a server, a desktop PC, a notebook computer, personal digital assistant, or any other processing devices.

The computing system 200 includes a computer 208 and one or more accompanying input/output devices 206 including a display 202 having a screen 204, a keyboard 210, other I/O device(s) 212, and a mouse 214. The other device(s) 212 can include a touch screen, a voice-activated input device, a track ball, and any other device that allows the system 200 to receive input from a developer and/or a user. The computer 208 includes system hardware 220 including a processing unit 226, a basic input/output system (BIOS) 222, and random access memory and/or read-only memory 230. A file store 280 is communicatively connected to computer 208. File store 280 may be internal such as, e.g., one or more hard drives, or external such as, e.g., one or more external hard drives, network attached storage, or a separate storage network.

Memory 230 includes an operating system 240 for managing operations of computer 208. In one embodiment, operating system 240 includes a hardware interface module 254 that provides an interface to system hardware 220. In addition, operating system 240 includes a kernel 244, one or more file systems 246 that manage files used in the operation of computer 208 and a process control subsystem 248 that manages processes executing on computer 208. Operating system 240 further includes one or more device drivers 250 and a system call interface module 242 that provides an interface between the operating system 240 and one or more application modules 262 and/or libraries 264. The various device drivers 250 interface with and generally control the hardware installed in the computing system 200.

In operation, a boot management module 262 and at least one boot image repository 264 resides in memory 230 of computer 208. In operation, applications executing on computer 200 make calls to the system call interface module 242 to execute one or more commands on the computer's processor. The system call interface module 242 invokes the services of the file systems 246 to manage the files required by the command(s) and the process control subsystem 248 to manage the process required by the command(s). The file system(s) 246 and the process control subsystem 248, in turn, invoke the services of the hardware interface module 254 to interface with the system hardware 220. The operating system kernel 244 can be generally considered as one or more software modules that are responsible for performing many operating system functions.

The particular embodiment of operating system 240 is not critical to the subject matter described herein. Operating system 240 may be embodied as a UNIX operating system or any derivative thereof (e.g., Linux, Solaris, etc.) or as a Windows® brand operating system.

Figure 3:
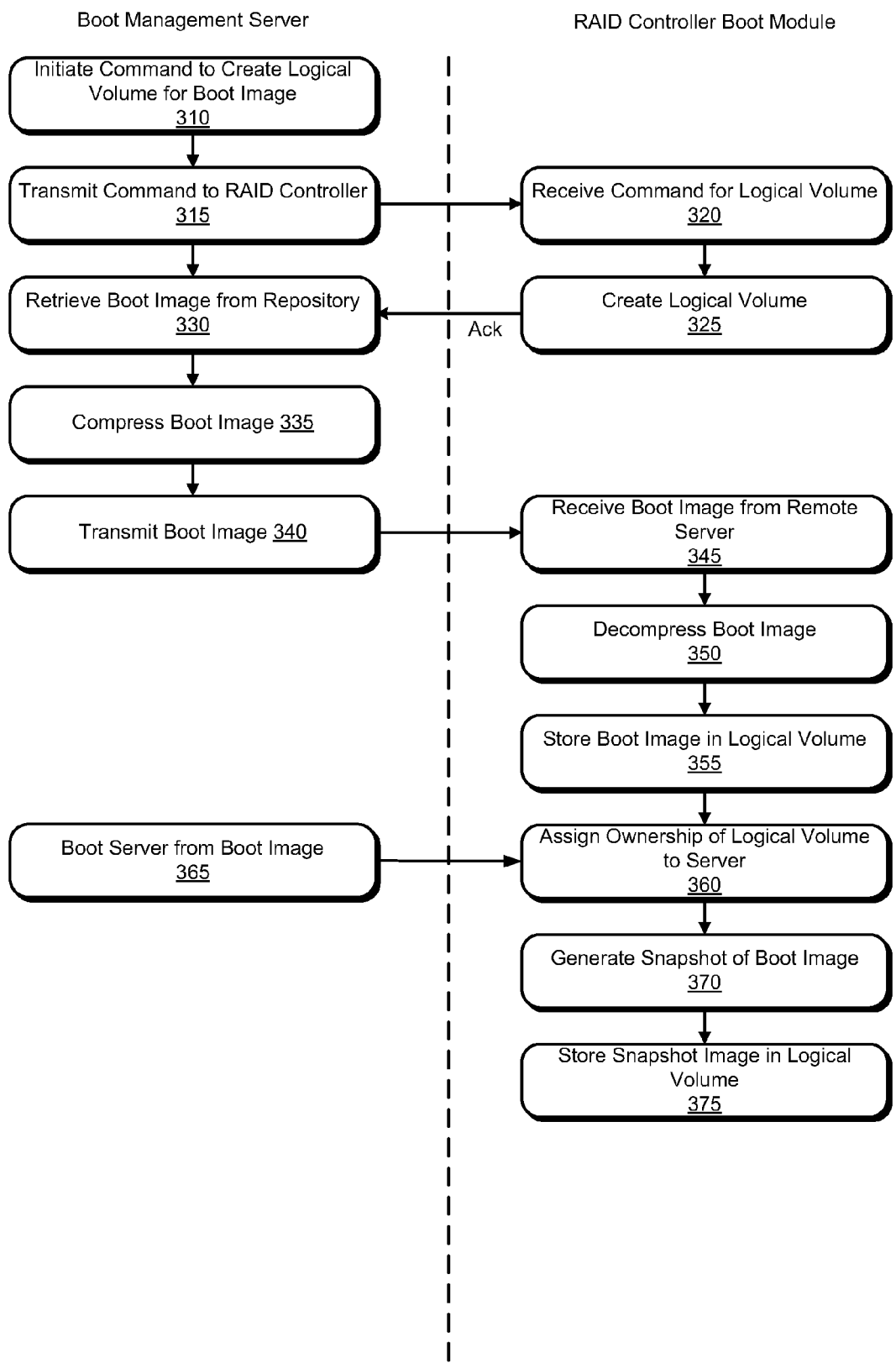
FIG. 3 is a flowchart illustrating operations associated with deployment of boot images in diskless servers, according to some embodiments.

In one embodiment, boot management module 262 cooperates with the boot module 148 of RAID controller 140 to implement operations to enable deployment of boot images to the server. FIG. 3 is a flowchart illustrating operations associated with deployment of boot images in diskless servers, according to some embodiments. In some embodiments, the operations depicted in FIG. 3 may be implemented by the boot module 148 in the RAID controller 142 in cooperation with the boot management module 262 of the server 200.

Referring to FIG. 3, at operation 310 the boot management module 262 initiates a command to create a logical volume in the storage pool 160 for a boot image. At operation 315 the boot management module 262 transmits the command to a RAID controller 140 in the diskless server system 110 via the out-of-band communication link.

At operation 320 the RAID controller 140 receives the command to create a logical volume for the boot image, and at operation 325 the RAID controller creates a logical volume for the boot image. In some embodiments, the RAID controller may transmit an acknowledgment (ACK) via the out-of-band communication link to signal to the boot management module 262 that the logical volume has been created.

At operation 330 the boot management module 262 retrieves a boot image from the boot image repository 264. In some embodiments, the boot management module 262 may compress the boot image (operation 335) before the boot image is transmitted (operation 340) to the RAID controller via the out-of-band communication link.

At operation 345 the RAID controller receives the boot image from the remote server. If the boot image was compressed (operation 335), then the RAID controller decompresses (operation 350) the boot image. At operation 355 the boot image is stored in the logical volume created for the boot image in operation 325.

At operation 360 the RAID controller 140 assigns ownership of the logical volume to a particular server 120 in the system 110. At operation 365 the boot management module 262 initiates a boot operation for a server 120. The server 120 would boot in a normal fashion using the boot image in the logical volume created in operation 325.

In some embodiments, the RAID controller 140 may generate one or more snapshots of the boot image (operation 370) which can be stored in additional logical volumes 166, 168, in the storage pool 160 (operation 375).

Thus, the operations depicted in FIG. 3 enables a diskless blade server system such as the system 110 depicted in FIG. 1 to deploy boot images from a remote source such as a remote boot image server. Because the boot image is retrieved by the RAID controller 140 via a management interface the boot image can be retrieved and stored before the server 120 is powered up, or even before the server 120 is present in the system 110. In addition, in some embodiments the management interface operates according to a high speed communication protocol such as, for example, an Ethernet protocol. Such high-speed protocols permit the RAID controller 140 to retrieve large boot images quickly.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to deploy a boot image in a diskless server in a computer system, comprising:
   initiating, in a remote management server coupled to a RAID controller in the computer system by an out-of-band communication link and without receiving a request from a first diskless server, a command to instruct the RAID controller to create at least a first logical volume in a memory module coupled to the RAID controller;
   transmitting the command to the RAID controller via the out-of-band communication link;
   in response to the command, creating, by the RAID controller, the first logical volume for the boot image;
   transmitting a boot image from the remote management server to the RAID controller via the out-of-band communication link;
   storing the boot image in the first logical volume;
   assigning ownership of the first logical volume to the first diskless server in the computer system; and
   initiating a boot operation for the first diskless server, wherein the first diskless server boots from the boot image in the first logical volume.

2. The method of claim 1, wherein transmitting a boot image from the remote management server to the RAID controller to a remote server comprises transmitting the boot image via the out-of-band communication link.

3. The method of claim 1, wherein transmitting a boot image from the remote management server to the RAID controller to a remote server comprises:
   retrieving the boot image from a repository of approved boot images; and
   compressing the boot image.

4. The method of claim 3, further comprising:
   receiving the boot image at the RAID controller; and
   decompressing the boot image.

5. The method of claim 4, further comprising:
   passing a pointer to the logical volume from the RAID controller to the diskless server.

6. The method of claim 1, further comprising:
   generating a snapshot of the logical volume; and
   storing the snapshot in a memory module.

7. The method of claim 1 wherein transmitting the boot image further comprises transmitting the boot image before the first diskless server is powered up.

8. The method of claim 1 wherein transmitting the boot image further comprises transmitting the boot image before the first diskless server is coupled to the computer system.

9. A system, comprising:
   a first computer system comprising:
      at least a first diskless server;
      at least a first RAID controller coupled to the first diskless server; and
      at least a first storage pool coupled to the RAID controller;
   a remote management server coupled to the RAID controller via an out-of-band communication link and comprising a boot management module which, when executed:
      initiates a command to instruct the RAID controller to create at least a first logical volume in a memory module coupled to the RAID controller, wherein the command is initiated without receiving a request from the first diskless server;
      transmits the command to the RAID controller via the out-of-band communication link; and
      transmits a boot image from the remote management server to the RAID controller via the out-of-band communication link; and
   wherein the RAID controller:
      creates the first logical volume for the boot image in response to the command; and
      stores the boot image in the first logical volume.

10. The system of claim 9, wherein the boot management module:
   assigns ownership of the first logical volume to a first diskless server in the computer system; and
   initiates a boot operation for the first diskless server, wherein the first diskless server boots from the boot image in the first logical volume.

11. The system of claim 9, wherein the boot management module transmits a boot image from the remote management server to the RAID controller to a remote server comprises transmitting the boot image via the out-of-band communication link.

12. The system of claim 9, wherein the boot management module:
   retrieves the boot image from a repository of approved boot images; and
   compresses the boot image.

13. The system of claim 12, wherein the RAID controller:
   receives the boot image at the RAID controller; and
   decompresses the boot image.

14. The system of claim 13, wherein the RAID controller:
   passes a pointer to the logical volume from the RAID controller to the diskless server.

15. The system of claim 9, wherein the RAID controller:
   generates a snapshot of the logical volume; and
   stores the snapshot in a memory module.

16. The system of claim 9 wherein the remote management server transmits the boot image before the first diskless server is powered up.

17. The system of claim 9 wherein the remote management server transmits the boot image before the first diskless server is coupled to the first computer system.

* * * * *